(12) United States Patent
Fuchs

(10) Patent No.: US 10,215,606 B2
(45) Date of Patent: Feb. 26, 2019

(54) DEVICE FOR DISPENSING A LIQUID MEDIUM

(71) Applicant: F + K Innovationen GmbH & Co. KG, Baden-Baden (DE)

(72) Inventor: Karl-Heinz Fuchs, Radolfzell (DE)

(*) Notice: Subject to any disclaimer, the term of this patent is extended or adjusted under 35 U.S.C. 154(b) by 0 days.

(21) Appl. No.: 15/529,200

(22) PCT Filed: Nov. 27, 2015

(86) PCT No.: PCT/EP2015/077880
§ 371 (c)(1),
(2) Date: May 24, 2017

(87) PCT Pub. No.: WO2016/083559
PCT Pub. Date: Jun. 2, 2016

(65) Prior Publication Data
US 2017/0328758 A1    Nov. 16, 2017

(30) Foreign Application Priority Data

Nov. 27, 2014  (DE) .................. 10 2014 117 390

(51) Int. Cl.
*G01F 11/44*    (2006.01)
*G01F 11/22*    (2006.01)
(Continued)

(52) U.S. Cl.
CPC .............. *G01F 11/44* (2013.01); *B65D 47/18* (2013.01); *B65D 47/32* (2013.01); *G01F 11/22* (2013.01)

(58) Field of Classification Search
CPC .......... G01F 11/44; G01F 11/42; G01F 11/46; G01F 11/22; B05D 47/18; B05D 47/32
(Continued)

(56) References Cited

U.S. PATENT DOCUMENTS

| 1,428,043 | A | * | 9/1922 | Lyons | ..................... G01F 11/22 222/133 |
| 1,442,435 | A | * | 1/1923 | Lyons | ..................... G01F 11/22 222/432 |
| 1,969,385 | A | * | 8/1934 | Raemer | ................... G01F 11/22 222/156 |

FOREIGN PATENT DOCUMENTS

DE            675 171 C      5/1939
DE     10 2011 106 261 A1   11/2012
(Continued)

OTHER PUBLICATIONS

International search report for Application No. PCT/EP2015/077880 dated May 4, 2016.

*Primary Examiner* — Lien Ngo
(74) *Attorney, Agent, or Firm* — Bachman & LaPointe, PC

(57) ABSTRACT

A device for dispensing a liquid medium (26) from a container (1), comprising a housing (13), a metering drum (2) accommodated therein and a sealing disk (14), the housing (13) having a drum outlet (3) and a system air admission structure (22), and the sealing disk (14) having an admission opening (12) and a drum inlet (4). The metering drum (2) comprises a metering chamber (5), a chamber outlet (6) and a chamber inlet (7). The metering drum (2) further has a rotary valve (8), said rotary valve (8), in a first working position, connecting the drum inlet (4) to the chamber inlet (7) while closing the chamber outlet (6), thereby admitting air to the container (1) and removing air from the metering chamber (5). In a second working position, The metering drum (2) closes the chamber inlet (7) while connecting the drum outlet (3) to the chamber outlet (6), thereby further admitting air to the metering chamber (5) and the air admission channel (11) being connected to the system air admission structure (22).

8 Claims, 15 Drawing Sheets

(51) Int. Cl.
*B65D 47/18* (2006.01)
*B65D 47/32* (2006.01)

(58) Field of Classification Search
USPC ............... 222/481.5, 442–454, 425–428
See application file for complete search history.

(56) References Cited

FOREIGN PATENT DOCUMENTS

| | | |
|---|---|---|
| EP | 0 649 684 A2 | 4/1995 |
| FR | 2 589 235 A1 | 4/1987 |
| GB | 402 132 A | 11/1933 |

* cited by examiner

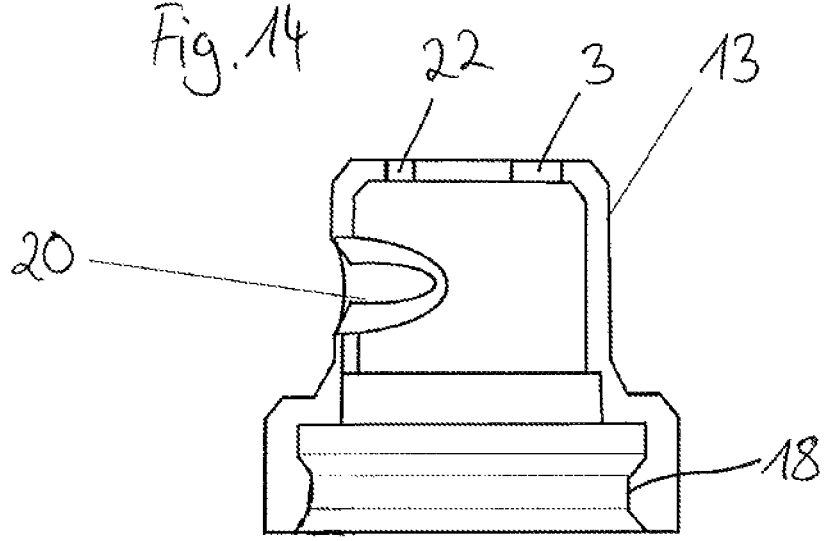
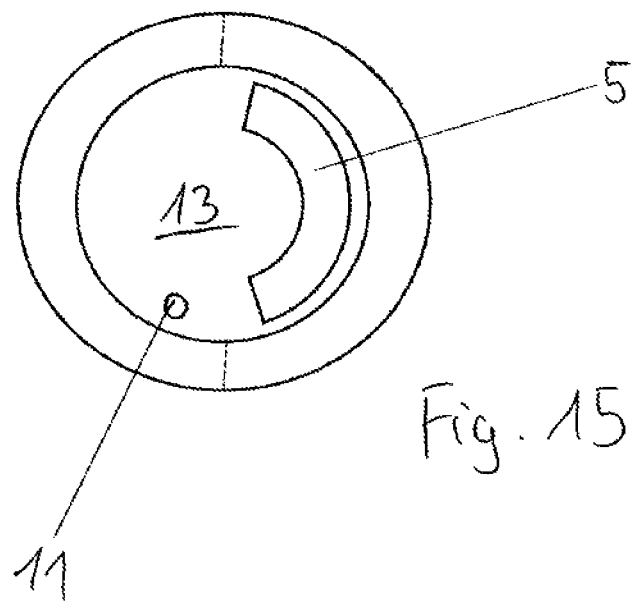

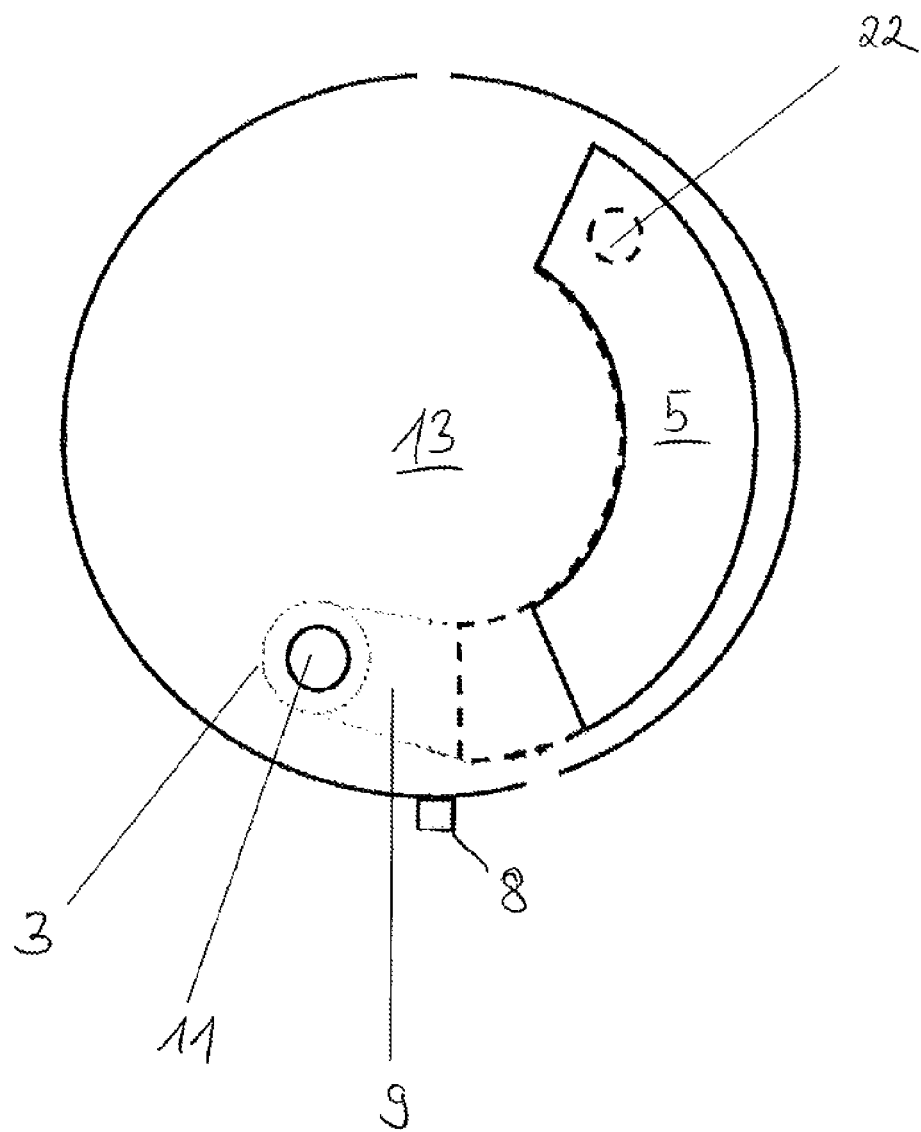

DEVICE FOR DISPENSING A LIQUID MEDIUM

BACKGROUND OF THE INVENTION

The invention relates to a device for dispensing a liquid medium.

Drip-feed systems on bottles, which function in the overhead position through the release of a single drop from the bottle neck with integrated dropper insert, are known from the prior art. In this context, reference is made to DE 10 2011 106 261 A1.

The known systems all have problems with the bottle aeration, so that, according to the bottle position and surface tension of the liquid to be metered, a drip is fed or not.

If the user shakes the bottle during the drop process, a plurality of drops can also escape simultaneously from the dropper insert.

If the patient information leaflet, for example, prescribes 20 drops, then the operator must count the desired drop quantity. In the event of constantly arising failures of the system, namely it fails to drip, a plurality of drops come at once, the counting becomes very troublesome and the consumer is guided by his quantity estimate and feeling.

SUMMARY OF THE INVENTION

The object of the invention is to provide a device which overcomes the drawbacks of the prior art.

The object is achieved by virtue of the features disclosed herein.

A device according to the invention for dispensing a liquid medium serves to dispense a certain number of drops of a medium from a container. The container here normally consists of glass or plastic. The container is connected to a housing by standard connection methods. For instance, the housing can be screwed on or clipped on. The housing contains a metering drum, which is accommodated therein, and a sealing disk.

In addition, the housing has a drum outlet and a system aeration facility, and the sealing disk has an aeration opening and a drum inlet. The metering drum, in turn, has a metering chamber, a chamber outlet and a chamber inlet. This is normally a case of bores or openings which serve for the through-flow of the liquid medium or the passage of air.

The metering drum comprises a rotary valve. The rotary valve is arranged on the housing such that it is rotatable in a semicircle. It is here rotatable similarly to a turn-lock fastening of a bottle, though no 360° rotation, but instead only a 180° to 270° rotation, takes place.

The rotary valve is set such that, in a first working position, it connects the drum inlet to the chamber inlet and closes the chamber outlet, and an aeration of the container and a deaeration of the metering chamber is realized. The first working position is generally constituted substantially by the first end point of the rotary motion of the rotary valve. The rotary valve is fixedly connected to the metering drum. This means that the metering drum reproduces the motion predefined by the rotary valve.

In the second working position of the rotary valve, the arrangement is such that the metering drum closes the chamber inlet and a further aeration of the metering chamber is realized, and the aeration duct is connected to the system aeration facility. The second working position is constituted substantially by the second end point of the rotary motion of the rotary valve.

Although intermediate settings between the first working position and the second working position also ensure functioning of the device, the functionality increases the closer their location is to the two end positions of the rotary motion.

Furthermore, the drum outlet has an aeration duct, which is intended to serve for the aeration of the total system. Through the aeration duct, according to the position of the metering drum, either the metering chamber or the container is supplied with air from outside, wherein the aeration duct, according to the working position, either establishes with the a connection between the metering chamber and the external atmosphere for deaeration purposes, or establishes a connection between the external atmosphere and the inside of the container.

Between the container and the metering drum is arranged a sealing disk, wherein the sealing disk is static to the metering drum. This means that the metering drum rotates relative to the sealing disk. To this end, the sealing disk has rotation locking mechanisms, which are accommodated either in the housing or on the neck of the container.

The sealing disk comprises the drum inlet and an aeration opening. Moreover, the metering chamber is constructed such that, in the first working position, a bypass to the aeration duct can be arranged. In the second working position, a further bypass between the metering chamber and the aeration duct can be arranged. The bypasses enable better functioning of the aeration of the individual parts, according to the working position of the metering drum.

The aeration duct can be brought, in the first working position, into operative connection with the aeration opening of the sealing disk. Furthermore, the metering chamber and the chamber inlet are arranged eccentrically in the metering drum.

The aeration duct is arranged eccentrically in the metering drum. The aeration opening and the drum inlet are arranged eccentrically in the sealing disk. This enables better functionality of the individual parts during the rotary motion of the metering drum.

The metering chamber is tapered from the chamber inlet to the chamber outlet. This has the advantage that the surface tension of the liquid medium to be metered can be better broken and better outflowing of the liquid medium is enabled.

he metering drum is arranged rotatably in the housing. The metering drum is sealed off from the housing.

In addition, protection for a use of a device for dispensing a liquid medium by means of the following steps is claimed:
    the device is brought into a fill setting;
    the rotary valve is rotated into the first working position, so that the metering chamber is filled from the container;
    the rotary valve is rotated into the second working position, so that the metering chamber is emptied via the drum outlet.

With the new idea, a fixedly set volume, drop quantity is intended to be made available to the operator, with the background that the consumer has the same handling (overhead operation) as with the known dropper systems.

For the drug manufacturer, the idea should likewise contribute to greater security in the application of the product, since an unwanted underdosage or overdosage due to the miscounting of the drops by the operator or due to the system dripping or not dripping, is no longer possible.

In order to apply different drop quantities, metering quantities, the system with different predosing drop quantities, for example 5, 10, 20 drops as the total drop volume, is offered to the pharmaceutical industry.

The device according to the invention serves for the metering of a desired drop quantity of liquid products. This can be a case of drugs, cosmetics, oils, liquid products.

The metering system can be employed on glass bottles, plastics bottles, tubes or other containers.

The device according to the invention constitutes a drop metering unit, mountable on a container, in the form of a reservoir metering unit of a plurality of combined drops as the metering volume.

In this context, "mountable" means that the drop metering unit can be screwed, clamped, clipped or otherwise mounted onto a bottle or similar container.

In the drop metering unit according to the invention, a metering drum is integrated in the drop metering housing, which metering drum can be manually rotated radially in the longitudinal axis of the system.

This means specifically that the drop metering unit receives the metering drum. The drum is arranged rotatably on or in the drop metering unit. The metering drum has a metering chamber, which is longitudinally arranged outside the system axis and thus rotates about the longitudinal axis of the metering drum.

In order to ensure the various system functions, such as aeration and deaeration of the metering chamber and bottle, as well as dispensing of the metered liquid quantity from the metering chamber with the required air diversion in conjunction with the leak-tightness of the system, the metering chamber rotates in the drum about the center axis.

The aeration bores, pour-out opening and liquid inlet are likewise disposed outside the central system axis.

The size, extent, volume, content or surface character of the metering chamber is adaptable to the products to be dispensed.

Preferredly, the metering chamber is of asymmetrical, or possibly cylindrical configuration.

The metering chamber cooperates with the active agent container, for example a bottle, in the aeration and deaeration, and also the filling, of the metering chamber.

This means that only liquid runs into the metering chamber if the system is used in an overhead setting and if, at the same time, air gets into the bottle, wherein the metering chamber must likewise, at the same time, be deventilated.

In order to make the liquid flow out of the metering chamber, the metering drum is manually rotated radially through approximately 90°-180.

In this state, the metering chamber is located over the discharge opening of the drop metering unit, and the liquid inflow from the active agent container is closed off.

Via an air branching of the bottle aeration, in this position air is guided behind the filled volume in the metering drum and metering chamber, so that the metered drop volume can flow out via the discharge opening.

The metering drum consists of a part having an actuating element for the rotation of the drum.

The metering drum is enclosed by the tubular metering housing, wherein, in the lower region toward the bottle, a sealing disk with the liquid inlet and the bottle aeration bore seals off the system from the bottle.

On the side of the tubular metering housing is a radial slot to allow rotation of the metering drum via the actuating element.

The tubular metering unit is sealed off from the atmosphere with a protective cap and protected against contamination.

In order to make the working of the system easier for the operator, symbols on the actuating element, in conjunction with the outer wall of the drop metering unit, indicate the position of the actuating element, for example "Fill" for the prefill position, the number 10 for 10 drops, and the liquid pour-out in the form of an outflowing drop.

The drop metering unit consists of 3-4 parts, the drop metering housing, the metering drum with actuating element and the sealing disk for sealing off the active agent container.

The system can be provided with a screw-in or plug-in protective cap.

BRIEF DESCRIPTION OF THE FIGURES

Further advantages, features and details emerge from the following description of preferred illustrative embodiments, wherein:

FIG. 14 is a section side view of a housing according to the invention;

FIG. 15 is a sectional top view according to the invention; and

FIGS. 16 and 17 are sectional top views of the housing and additional parts of the apparatus according to the invention.

DETAILED DESCRIPTION

Figure 1:
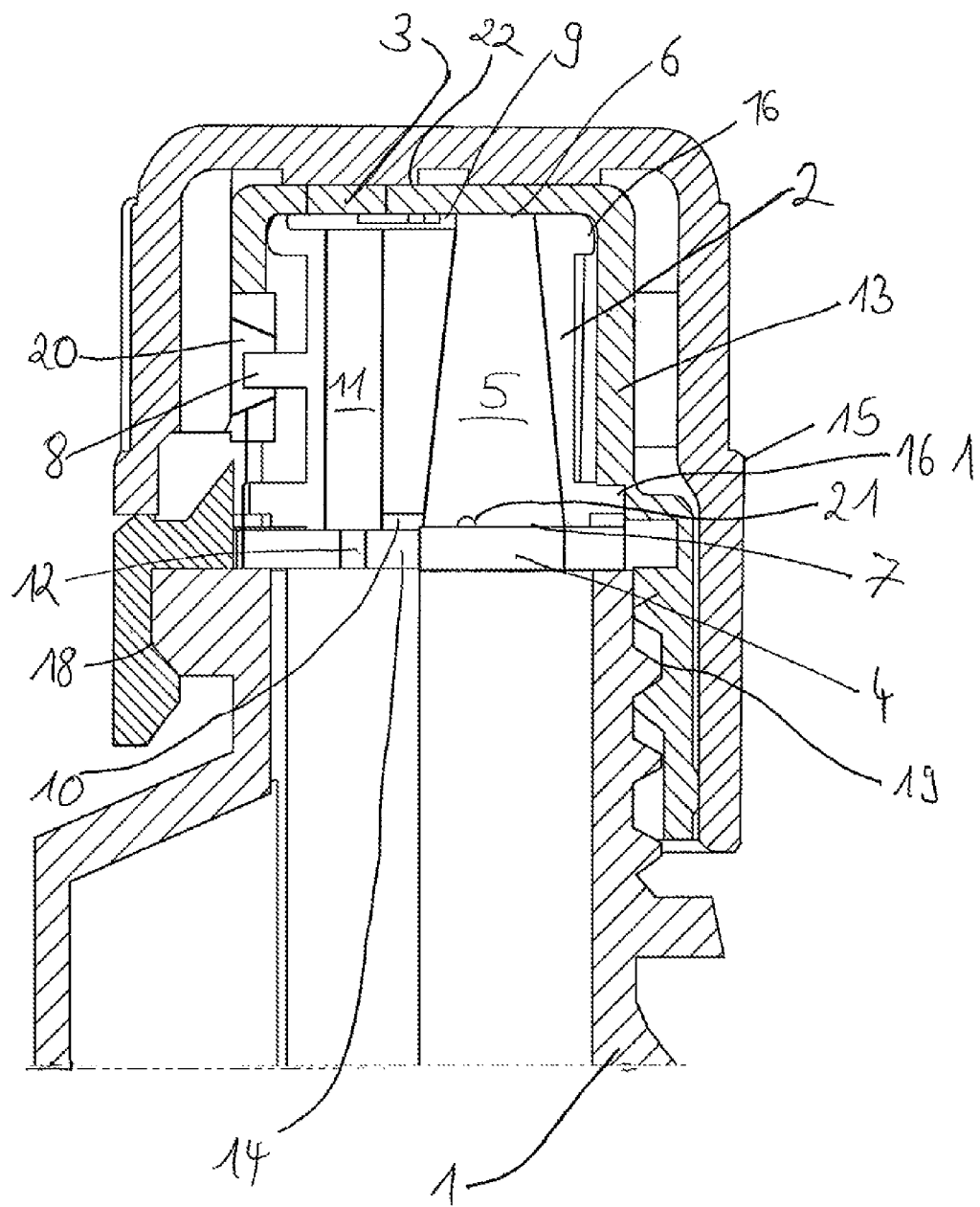
FIG. 1 is a cross sectional view of an apparatus according to the invention.

FIG. 1 shows a sectioned view of a device for dispensing a liquid medium 26, comprising a container 1 and a protective cap 15, wherein, with respect to a housing 13 and the container 1, two theoretically possible embodiments are represented in this figure, for viewing reasons, in combination.

The first illustrative embodiment shows a shrink fastening 18 between the container 1 and the correspondingly shaped housing 13.

The second illustrative embodiment shows a threaded fastening 19 between the container 1 and the correspondingly threaded housing 13. The protective cap 15 is respectively tailored to the two illustrative embodiments.

The housing 13 comprises a rotary valve slot 20, a drum outlet 3 and a system aeration facility 22, which, for diagrammatic reasons, is not represented. A metering drum 2, which is represented in a first working position, is arranged in a rotationally movable manner within the housing 13.

The metering drum 2 has a metering chamber 5, an aeration duct 11 and, in this embodiment, a rotary valve 8. The metering chamber 5 and the aeration duct 11 are respectively sited eccentrically in the metering drum 5. Furthermore, in the represented illustrative embodiment, the metering drum 2 possesses two circumferential seals 16 and 16.1, which seal off the metering drum 2 from the housing 13.

The metering chamber 5 possesses a chamber inlet 7 and a chamber outlet 6. The chamber inlet 7 is aligned with the container 1, the chamber outlet 6 lies opposite and is correspondingly applied by the container 1. In the shown first working position, the chamber inlet 7 establishes, via a drum inlet 4 of a sealing disk 14, a connection to the container 1.

The metering chamber 5 is shaped such that it tapers from the chamber inlet 7 toward the chamber outlet 6.

Furthermore, a semicircular bypass opening 21 is disposed on the chamber inlet 7 of the metering chamber 5. In a second working position (not shown), a contact is established, via this bypass opening 21, between a second bypass 10 and the aeration duct 11.

Moreover, at the chamber outlet 6 of the metering chamber 5 is arranged a first bypass 9. The first bypass 9 constitutes a connection to the aeration duct 11 or to the drum outlet 3, so that, when the metering chamber 5 is filled with a medium 26 from the container 1, air can escape from the metering chamber 5.

In the second working position (not represented), the aeration duct 11 or the first bypass 9 is connected to the system aeration facility 22 (not represented) of the housing 13.

The rotary valve 8 engages from inside in the rotary valve slot 20, so that, from outside the housing 13, the rotary valve 8 can be displaced, whereby the metering drum 2 is rotated in the housing 13. A switch can thereby be made from the first into the second working position.

The sealing disk 14 separates the metering drum 2 from the container 1 and is arranged immovably relative to the container 1 and the housing 13. An aeration opening 12 and the drum inlet 4 are likewise arranged eccentrically on the sealing disk 14.

In this illustrative embodiment, the aeration duct 11 is of tubular design and, in the represented first working position, connects the drum outlet 3 of the housing 13 to the aeration opening 12 of the sealing disk 14, and thus to the inside of the container 1.

Figure 2:
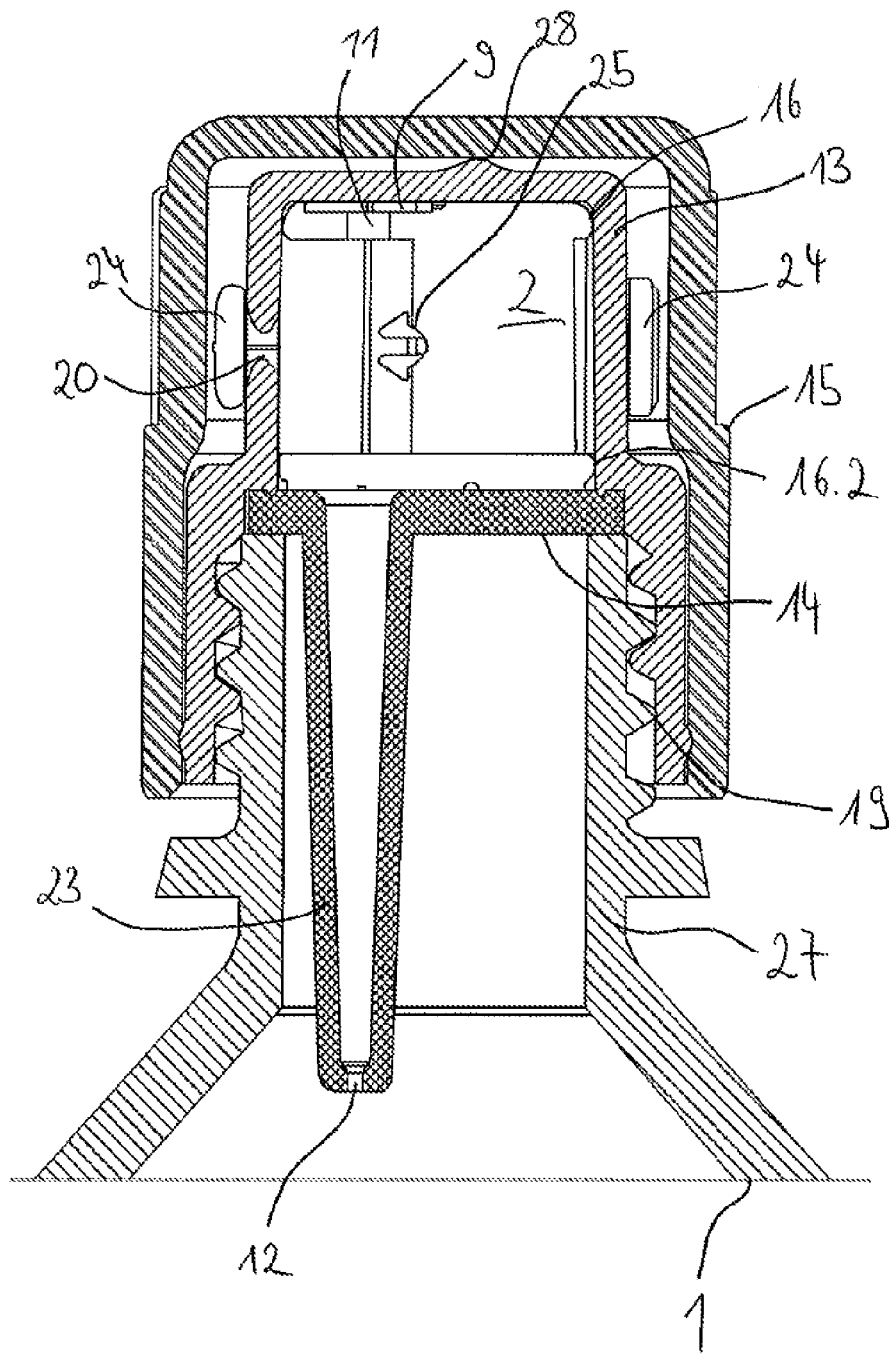
FIG. 2 is a cross sectional view of a further illustrative embodiment of a device according to the invention.

In FIG. 2, a further illustrative embodiment of a device for dispensing a liquid medium 26, comprising a container 1 and a protective cap 15, is represented in a sectioned view.

Here it can be seen that the sealing disk 14 has at the site of the aeration opening 12 an additional aeration tube 23. The aeration tube 12 reaches into the inside of the container 1 and bridges the elongate container neck 27 having the threaded fastening 19.

A further embodiment-dictated difference is presented by the housing 13, which possesses a bulge 28 that forms a point of support for the protective cap 15.

Further differences (apparent in this figure) from the embodiment from FIG. 1 concern the metering drum 2. This possesses, instead of the rotary valve 8, a drum valve 24. The drum valve is not a constituent part of the metering drum 2. The drum valve 24 is connected from outside as a separate component, through the rotary valve slot 20 of the housing 13, to the metering drum 2. The drum valve 24 is semicircular and runs halfway around the housing 13. This is illustrated in the following figures.

In addition, the metering drum 2 possesses a drum valve detent 25. Moreover, the seal 16.2 is configured such that it varies slightly in comparison to the seal 16.1 from FIG. 1.

Further elements of the metering drum 2, such as, for instance, the metering chamber 5, are not represented for diagrammatic reasons. Apart from the described differences, the structure and the working is in this illustrative embodiment identical with the illustrative embodiment described in FIG. 1.

Figure 3:
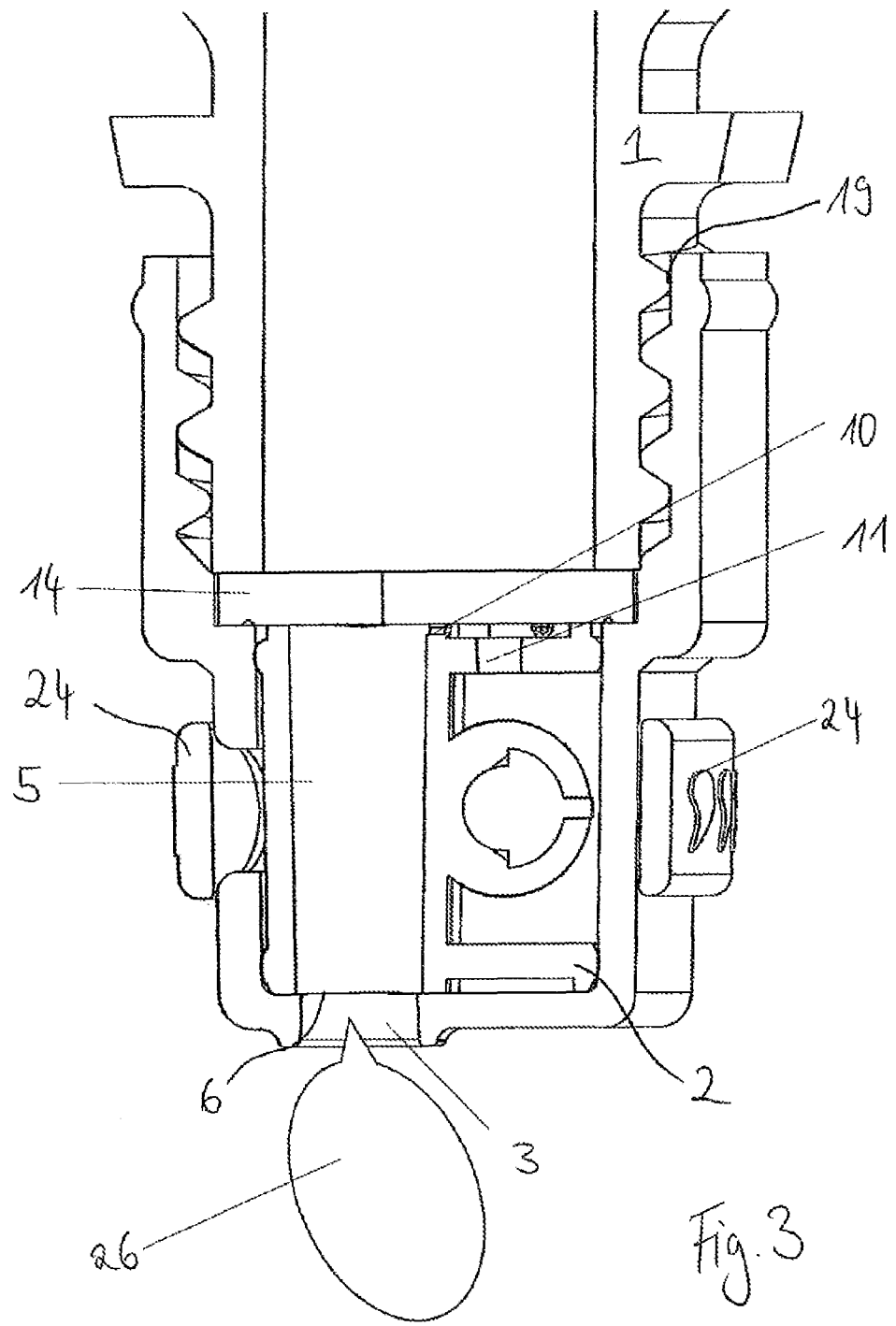
FIG. 3 illustrates a further embodiment of a device according to the invention.

In FIG. 3, a further illustrative embodiment of a device for dispensing the liquid medium 26, comprising the container 1, is represented in a sectioned view. In this illustrative embodiment, the situation of the second working position, in which the metering drum 2 closes the chamber inlet 7 (not visible) and connects the drum outlet 3 to the chamber outlet 6, is represented. A further aeration of the metering chamber 5 is here realized via the second bypass 10 and the aeration duct 11, which is connected to the system aeration facility 22 (not visible for diagrammatic reasons), so that the medium 26 can flow out of the metering chamber 5.

In addition, the semicircular drum valve 25 is discernible. In this illustrative embodiment, the threaded fastening 19 has been used and the sealing disk 14 corresponds to the embodiment shown likewise in FIG. 1.

Figure 4:
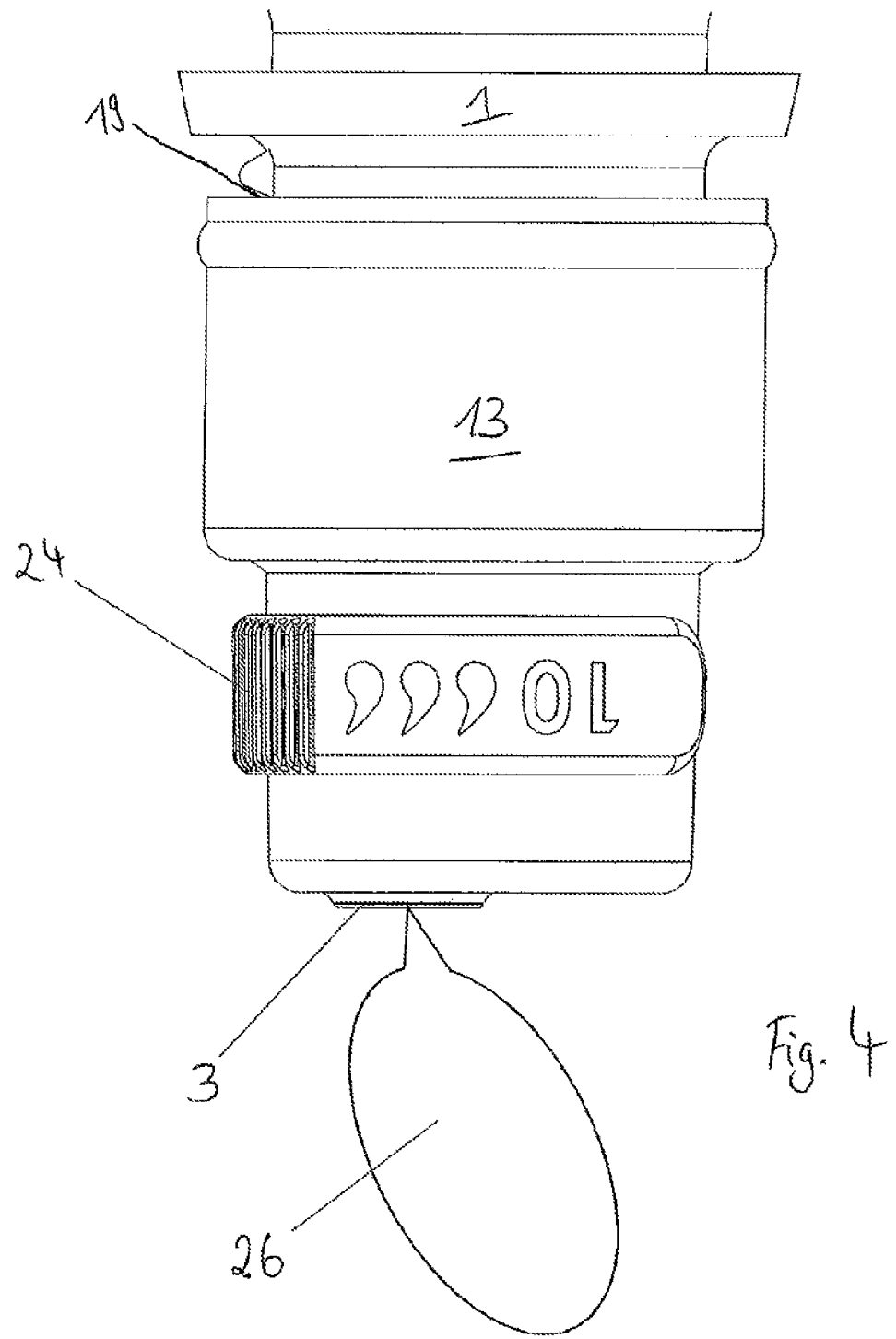
FIG. 4 illustrates a device for dispensing liquid medium and including a container according to the invention.

In FIG. 4, a device for dispensing the liquid medium 26, comprising the container 1, is represented. As already represented in FIG. 3, the situation of the second working setting, in which the medium 26 flows out of the metering chamber 5 (not visible) and via the drum outlet 3, is shown. In addition, the drum valve 24 can here be seen, how it is arranged in a semicircle around the housing 13. Here too, the connection to the container 1 is established via a threaded fastening 19.

Figure 5:
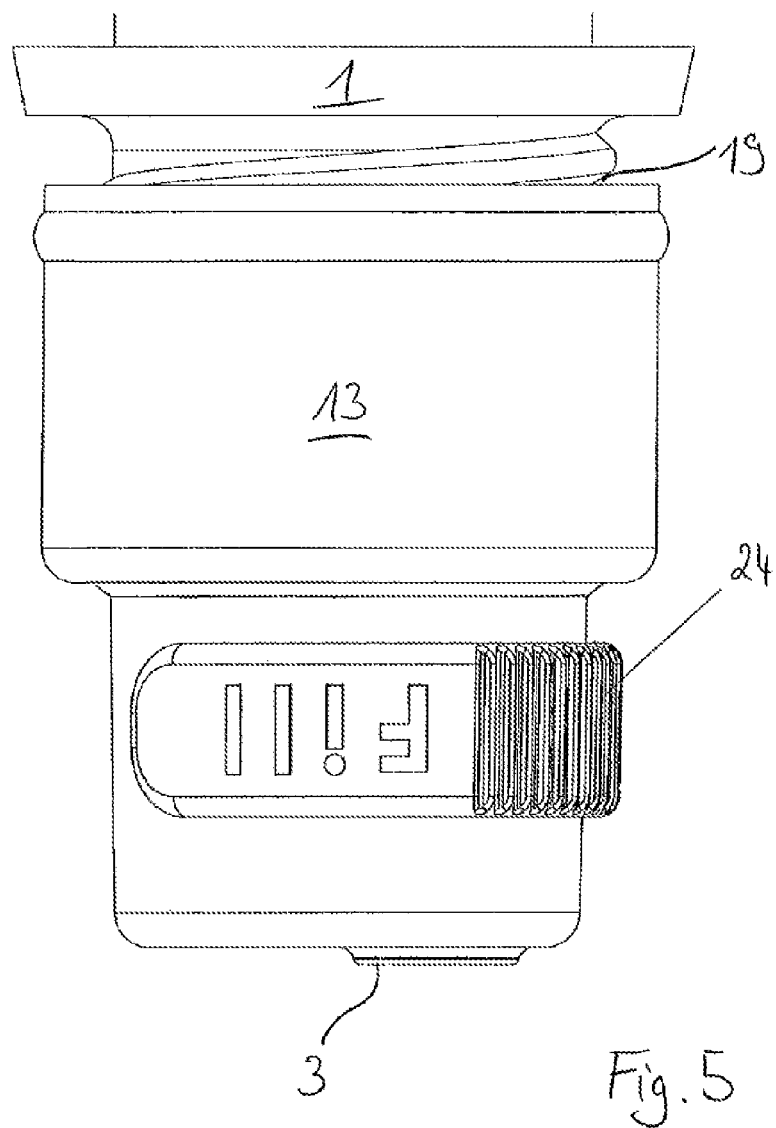
FIG. 5 is an unsectioned view of a device for dispensing liquid medium according to the invention.

In FIG. 5, an unsectioned view of a device for dispensing the liquid medium 26, comprising the container 1, is represented. In contrast to the represented situation from FIG. 4, here the situation of the first working position is represented. In this, the drum inlet 4 is connected to the chamber inlet 7 and the chamber outlet 6 is closed, wherein the aeration of the container 1 is realized via the aeration opening 12 or the aeration duct 11 or the drum outlet 3. A deaeration of the metering chamber 5 is realized via the first bypass 9. Although, for diagrammatic reasons, this cannot be seen, it can be reproduced in the representation in FIG. 1.

Figure 6:
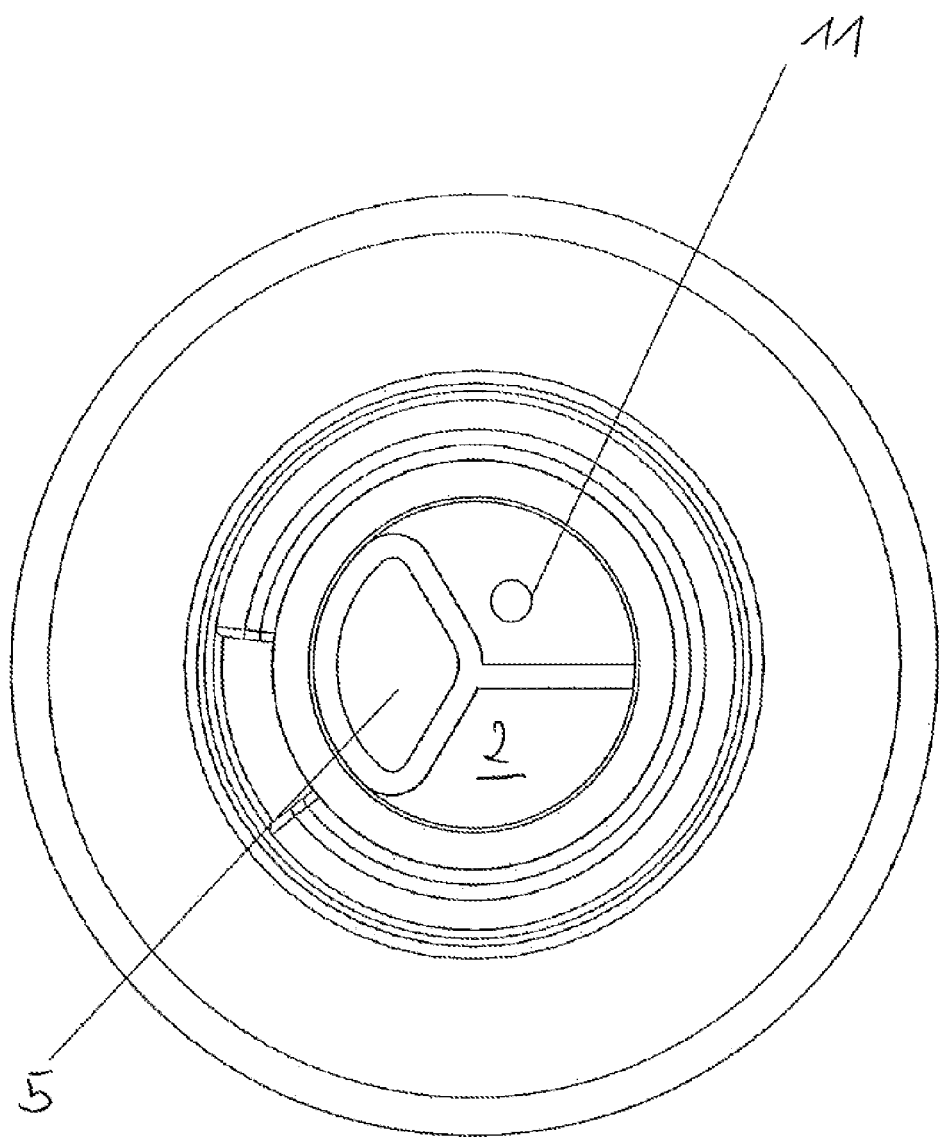
FIG. 6 shows a radial section of a device for dispensing liquid medium according to the invention.

FIG. 6 shows a radial section of a device for dispensing the liquid medium 26 through the metering chamber 5, with a view into the metering drum 2 and into the aeration duct 11.

Figure 7:
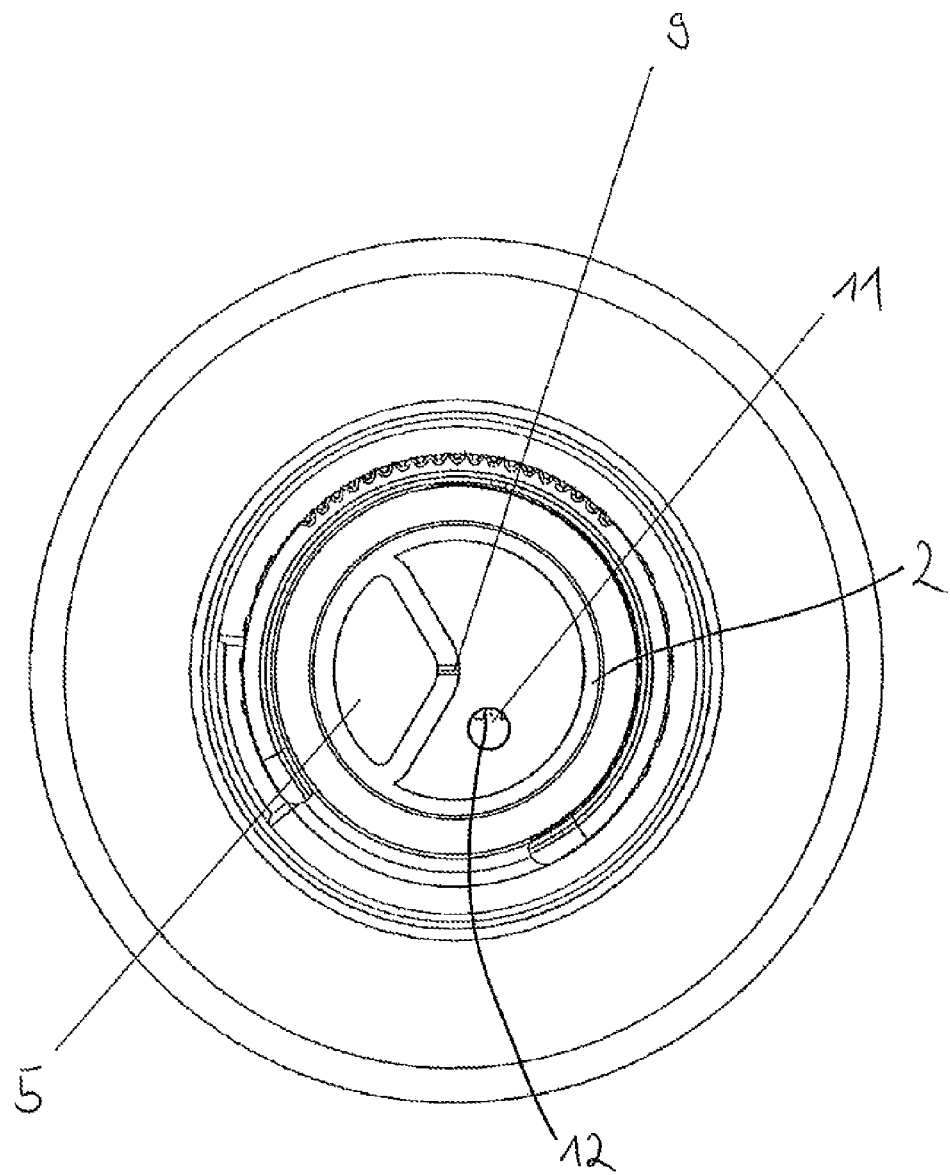
FIG. 7 shows a radial section through a device according to the invention.

FIG. 7 shows a radial section through a device for dispensing the liquid medium 26. This radial section allows the view through the aeration duct 11 onto the aeration opening 12. Moreover, the first bypass 9 is represented.

Figure 8:
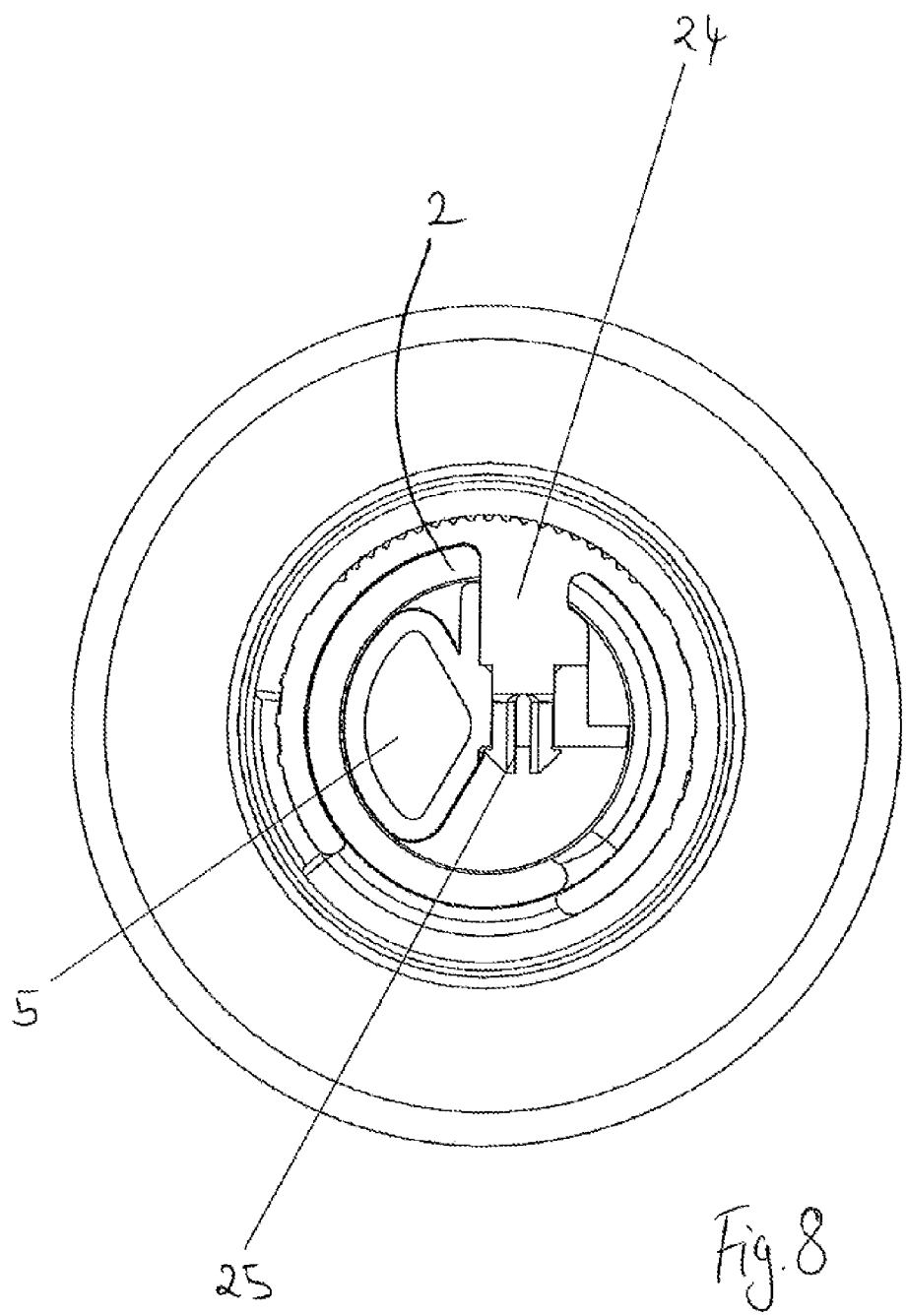
FIG. 8 shows a radial section through a further device according to the invention.

In FIG. 8, a radial section through a device for dispensing the liquid medium 26 in the region of the drum valve 24, of the drum valve detent 25 and of the metering chamber 5 is represented.

Figure 9:
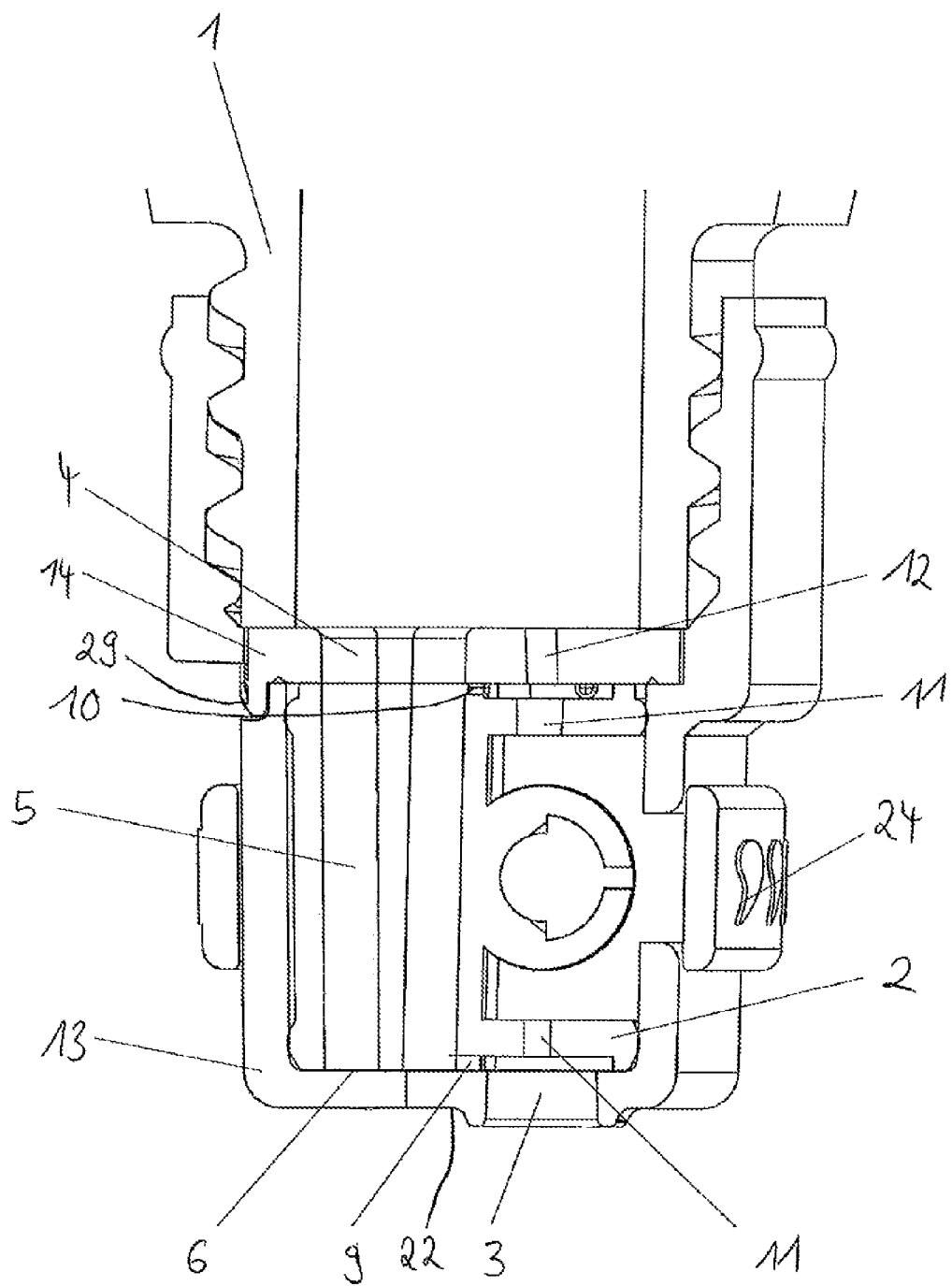
FIG. 9 illustrates first working position of a device in accordance with the invention.

In FIG. 9, the first working position of a device for dispensing the liquid medium 26 is represented in longitudinal section in an overhead position. In this situation, the medium 26 runs out of the container 1, via the sealing disk 14 with the drum inlet 4, into the metering chamber 5, wherein the deaeration of the metering chamber 5 is realized via the first bypass 9. The container aeration is realized via the aeration opening 12 of the sealing disk 14 and via the aeration duct 11 and via the drum outlet 3.

The sealing disk 14 with the aeration opening 12 also seals off the system from the container 1 and from the atmosphere, wherein the geometry of the sealing disk 14 is provided with a centering element 29 and is hence twist-proof relative to the housing 13 and the container 1.

Figure 10:
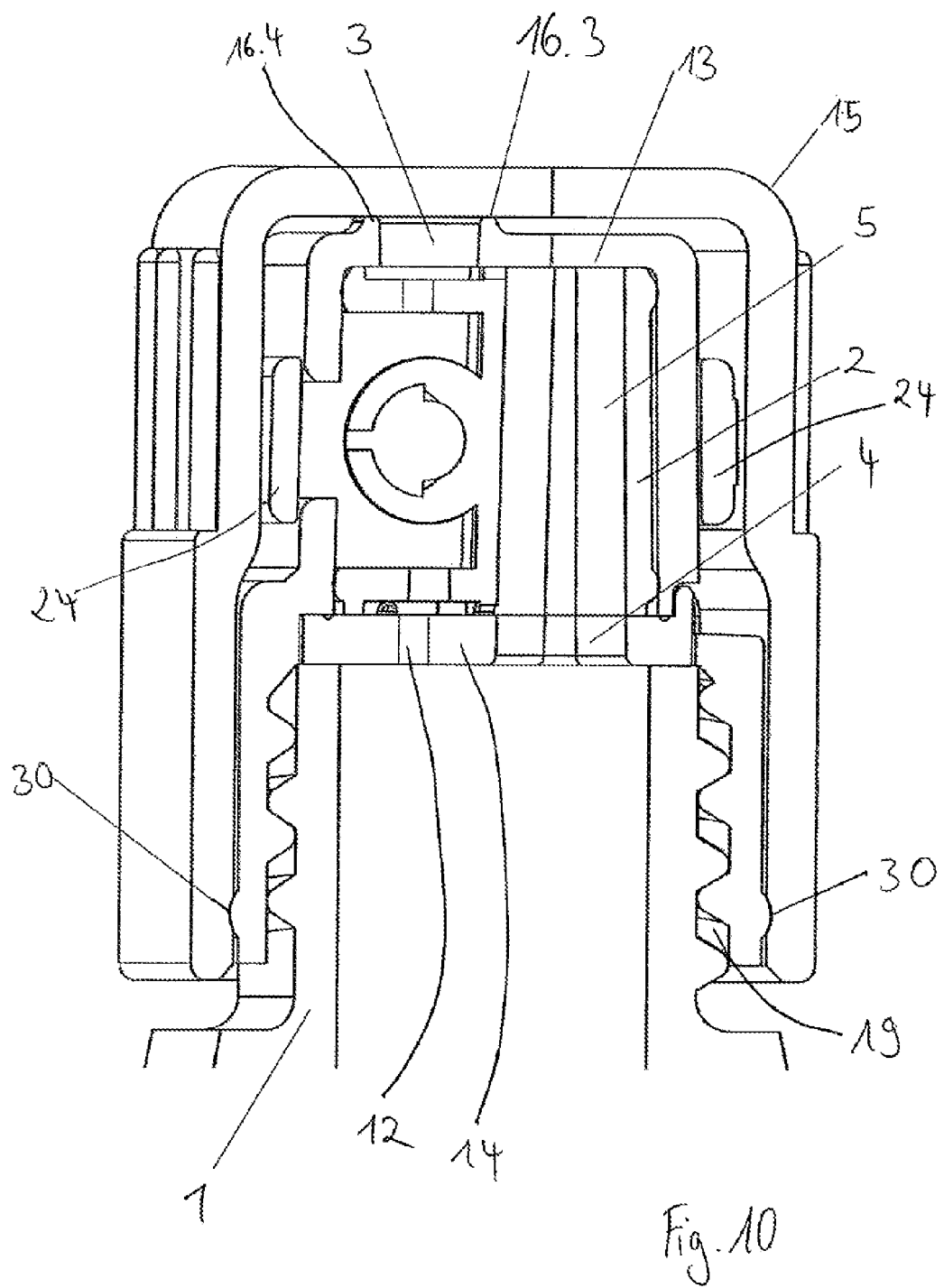
FIG. 10 illustrates a device according to the invention longitudinal section.

In FIG. 10, a device for dispensing the liquid medium 26 is represented as a longitudinal section with sealing-off seals 16.3 and 16.4, the protective cap 15 and the protective cap anchorage 17. The section shows the system in the first working position, screwed onto the container 1.

Figure 11:
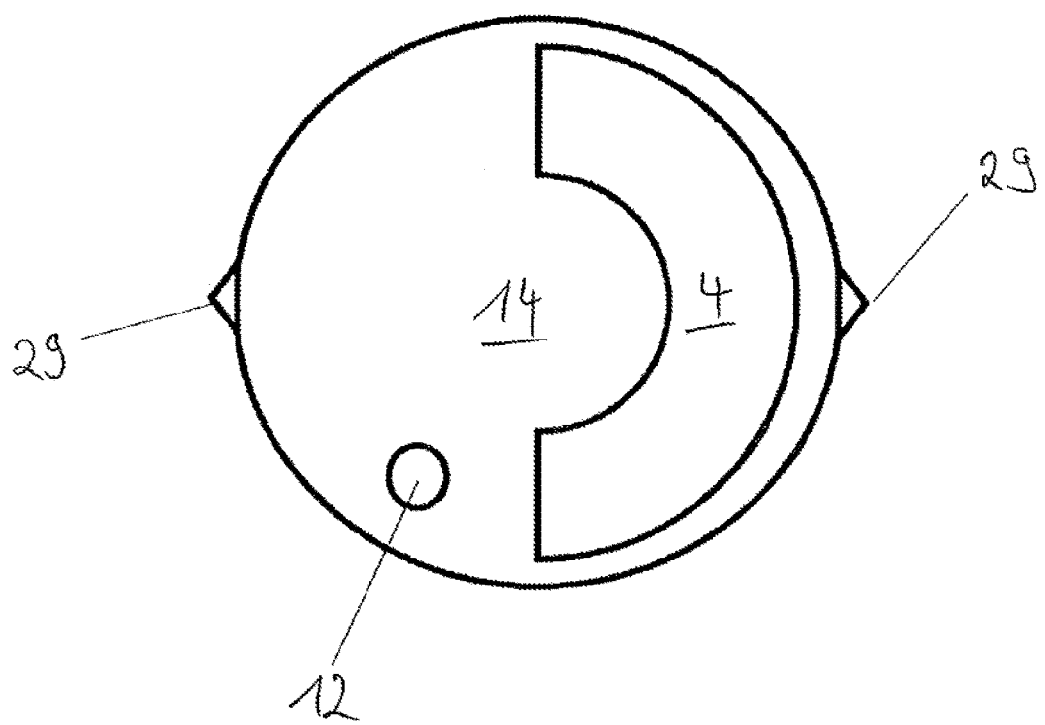
FIG. 11 is a top view of a sealing disk with drum inlet in accordance with the invention.

In FIG. 11, a top view of the sealing disk 14 with the drum inlet 4, the aeration opening 12 and the two centering elements 29 can be seen. The drum inlet 4 and the aeration opening 12 are arranged eccentrically on the sealing disk 14.

Figure 12:
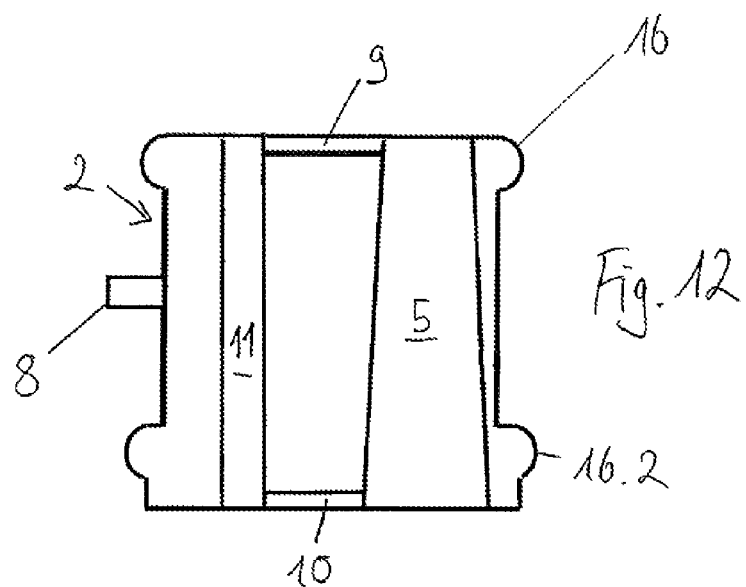
FIG. 12 is a sectional side view of a metering drum according to the invention.

In FIG. 12, a sectioned side view of the metering drum 2 is represented. This latter comprises the rotary valve 8, the aeration duct 11, the metering chamber 5, the seals 16 and 16.2, and the first bypass 9 and second bypass 10, which connect the aeration duct 11 and the metering chamber 5.

Figure 13:
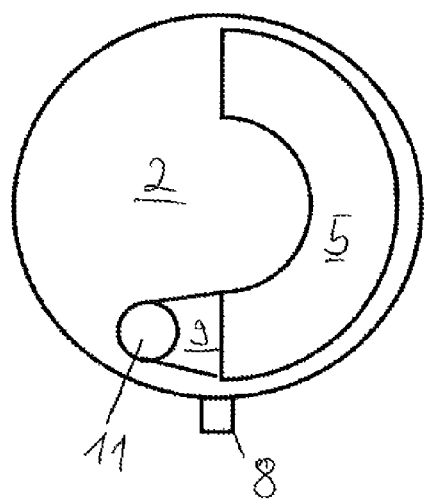
FIG. 13 is a top view of the metering drum.

In FIG. 13, a top view of the metering drum 2 can be seen. In this, the metering chamber 5, the aeration duct 11, the first bypass 9 and the externally adjoining rotary valve 8 can be seen.

In FIG. 14, a sectioned side view of the housing 13 is represented. In this illustrative embodiment, the housing 13 comprises the shrink fastening 18, by which it is connected to the container 1. In addition, the rotary valve slot 20 is represented, as well as the drum outlet 3 and the system aeration facility 22.

In FIG. 15, a sectioned top view of the housing 13 can be seen. Here the eccentric arrangement of the metering chamber 5 and of the aeration duct 11 inside the housing 13 can be seen.

Figure 16:
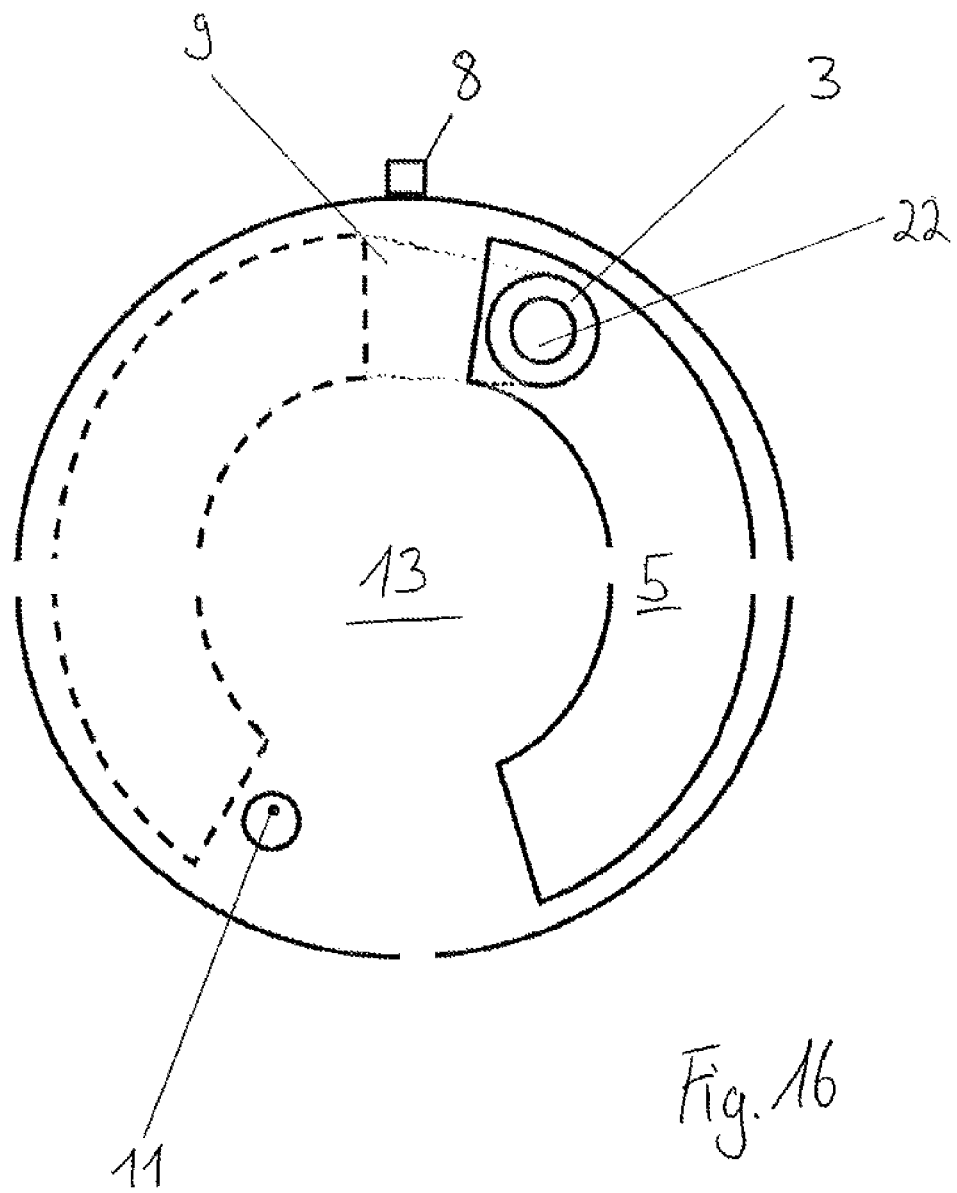

In FIG. 16 and FIG. 17, a sectioned top view of the housing 13 and parts of the metering drum 2 can be seen. By the dashed lines, the rotary motion of the metering drum 2 relative to the fixed housing 13 is represented. All constituent parts which are shown there have already been repeatedly described in the previous figures.

The invention claimed is:

1. A device for dispensing a liquid medium (26) from a container (1), comprising a housing (13), a metering drum (2) accommodated therein, and a sealing disk (14), wherein
   the housing (13) has a drum outlet (3) and a system aeration facility (22), and
   the sealing disk (14) has an aeration opening (12) and a drum inlet (4),
   wherein the metering drum (2) has a metering chamber (5), a chamber outlet (6) and a chamber inlet (7), wherein
   the metering drum (2) comprises a rotary valve (8),
   wherein the rotary valve (8), in a first working position, connects the drum inlet (4) to the chamber inlet (7) and closes the chamber outlet (6), and an aeration of the container (1) and a deaeration of the metering chamber (5) is realized;
   and, in a second working position, the metering drum (2) closes the chamber inlet (7) and connects the drum outlet (3) to the chamber outlet (6) and a further aeration of the metering chamber (5) is realized, and the aeration duct (11) is connected to the system aeration facility (22), wherein in the second working position, a further bypass (10) between the metering chamber (5) and the aeration duct (11) can be arranged, wherein the aeration duct (11) can be brought, in the first working position, into operative connection with the aeration opening (12) of the sealing disk (14), wherein the metering chamber (5), the chamber inlet (7) and the aeration duct (11) are arranged eccentrically in the metering drum (2), wherein the aeration opening (12) and the drum inlet (4) are arranged eccentrically in the sealing disk (14), and wherein the metering chamber (5) is tapered from the chamber inlet (7) to the chamber outlet (6).

2. The device as claimed in claim 1, wherein the drum outlet (3) has the aeration duct (11).

3. The device as claimed in claim 1, wherein, between the container (1) and the metering drum (2) is arranged the sealing disk (14), wherein the sealing disk (14) is static to the metering drum (2).

4. The device as claimed in claim 3, wherein the sealing disk (14) comprises the drum inlet (4) and the aeration opening (12).

5. The device as claimed in claim 2, wherein, in the first working position, a bypass (9) from the metering chamber (5) to the aeration duct (11) can be arranged.

6. The device as claimed in claim 1, wherein the metering drum (2) is arranged rotatably in the housing (13).

7. The device as claimed in claim 1, wherein the metering drum (2) is sealed off from the housing (13).

8. A use of a device as claimed in claim 1, comprising the following steps:
   the device is brought into a fill setting;
   the rotary valve is rotated into the first working position, so that the metering chamber (5) is filled from the container (1),
   the rotary valve is rotated into the second working position, so that the metering chamber (5) is emptied via the drum outlet (3).

* * * * *